US009315007B2

(12) United States Patent
Vaniglia

(10) Patent No.: US 9,315,007 B2
(45) Date of Patent: Apr. 19, 2016

(54) COMPOSITES SYSTEM WITH DOCKABLE HEADS

(71) Applicant: MAG IAS, LLC, Sterling Heights, MI (US)

(72) Inventor: Milo M. Vaniglia, Cold Spring, KY (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 333 days.

(21) Appl. No.: 13/747,797

(22) Filed: Jan. 23, 2013

(65) Prior Publication Data

US 2014/0202640 A1    Jul. 24, 2014

(51) Int. Cl.
*B29C 70/38*    (2006.01)
*B32B 38/18*    (2006.01)

(52) U.S. Cl.
CPC ............... *B32B 38/18* (2013.01); *B29C 70/38* (2013.01); *Y10T 156/17* (2015.01)

(58) Field of Classification Search
CPC .... B29C 70/38; B29C 70/382; B29C 70/384; B29C 70/386; B29C 70/388
See application file for complete search history.

(56) References Cited

U.S. PATENT DOCUMENTS

| | | | |
|---|---|---|---|
| 6,842,666 B2 * | 1/2005 | Katsuta | 700/245 |
| 6,968,883 B2 * | 11/2005 | Torres Martinez | 156/433 |
| 7,472,736 B2 * | 1/2009 | Kisch et al. | 156/433 |
| 2006/0180264 A1 | 8/2006 | Kisch et al. | |
| 2010/0200168 A1 * | 8/2010 | Oldani et al. | 156/441 |
| 2012/0035754 A1 | 2/2012 | Oldani | |
| 2012/0241093 A1 * | 9/2012 | Borgmann | 156/350 |

FOREIGN PATENT DOCUMENTS

| | | | |
|---|---|---|---|
| EP | 0079735 A2 * | 5/1983 | |
| FR | 2915925 A1 | 11/2008 | |
| GB | 2157649 A * | 10/1985 | |

OTHER PUBLICATIONS

Emmert, W. et al, "R U Reinforcing plastics with robots?", Plastics Engineering, May 1981, pp. 37-46.*
MAG-212, press release, Jan. 25, 2012, "Industry first in aerospace composites, MAG's new GEMINI Composite Processing System offers Docking, switches from fiber palcement to tape laying in minutes—first system ordered by Allian Techsystems", 3 pages.*
Final Report, Recovery Act: Wind Blade Manufacturing Innovation, DOE award No. DE-EE0001372, Dec. 16, 2011, pp. 1-49.*
European Search Report EP 14151882.9-1703; 2759393 dated Aug. 11, 2014; 8 pages.
European Search Report EP 14151882.9-1703; dated May 20, 2014; 6 pages.

* cited by examiner

*Primary Examiner* — Jeff Aftergut

(57) ABSTRACT

A composites lamination system uses a six-axis positioner and multiple removable heads for applying composite material to a tool. The six-axis positioner has a gantry and a wrist. The gantry has two spaced uprights that support a crossbeam that is movable in the X-axis. A workzone containing a tool is positioned between the two spaced uprights. A movable column is supported on the crossbeam, and is movable relative to the crossbeam in the Y-axis and the Z-axis. A wrist mounted on the column rotates around an I-axis parallel to the X-axis, around a J-axis parallel to the Y-axis, and around a K-axis parallel to the Z-axis. A replaceable head is mounted on the wrist so that the gantry and the wrist provide six axis of motion for the replaceable head, and removal of the head from the wrist allows the six axis of motion to remain with the positioner.

10 Claims, 5 Drawing Sheets

US 9,315,007 B2

COMPOSITES SYSTEM WITH DOCKABLE HEADS

FIELD

The invention relates to a 6-axis gantry composites lamination system having the ability to quickly change heads to lay composite contour tape layer grade tape or fiber towpreg, or to trim or ink mark composite material, or to perform other functions.

BACKGROUND

Composites lamination systems are used to manufacture aircraft and aerospace components, wind turbine components, and other articles where high strength and light weight are primary objectives. Composite contour tape layer (CTL) grade tape and fiber towpreg are both widely used; each system has its advantages and limitations.

A fiber placement head provides independent control over material feed via the clamp, cut and re-start mechanism for up to 16 individual tows of composite prepreg slit tape (towpreg), allowing automated "on-the-fly" adjustment of the fiber band width, controlled placement of fibers around changing contours, and precise configuration of openings. The fiber placement head allows wrinkle-free, near-net-shape lay-up of enclosed and deeply contoured structures and concave/convex surfaces. The fiber placement head is ideal for precision production of fuselage sections, outer mold line and inner mold line panels, cowls, ducts and nozzle cones for commercial, military and space vehicles, including parts that make use of lightweight honeycomb core materials.

A tape laying head deposits carbon/epoxy CTL grade tape at speeds up to 60 m/min (2400 inches per minute) using 75, 150 or 300 mm (3, 6 or 12 in) carbon/epoxy tape at any orientation and number of plies, ensuring consistent quality, part shape, thickness and strength.

The same application head cannot be used to lay up both tape and fiber towpreg, and as a result, laying up CTL grade tape and then switching to fiber towpreg requires moving the article being laid up from a first machine to a second machine. Because the article being laid up is usually large, relocating a half laid up article from a tape laying machine to a fiber placement machine or vice-versa is a cumbersome, time consuming task and reduces accuracy of ply-to-ply placement.

Certain prior art systems with removable and interchangeable heads have one or more major machine axes that stay with the head and dock away from the machine when the heads are switched due to their concept configuration or the legacy design from which they are derived. This makes the cost of each individual head more expensive since duplicate axis hardware is built into each head. Other head designs incorporate an integral wrist and creel that stays with the head and detaches from the remainder of the machine when one head is swapped for another, thus adding even more cost for the redundant mechanism that is designed into a multi-head system.

OBJECTS

Accordingly it would be desirable to design a composites lamination system that would be able to lay up both composite CTL grade tape and composite fiber towpreg.

It would further be desirable to design a composites lamination system that would be able to quickly and efficiently change heads from one that lays up tape to one that lays up fiber.

It would further be desirable to design a composites lamination system that employs multiple replaceable heads in which none of the six motion axis of the system resides with the head.

It would further be desirable to have a composites lamination system with a six-axis gantry positioner with live docking stations to support a fiber placement head and CTL tape head in a docking zone within the reach and travel of the positioner.

DESCRIPTION OF THE PREFERRED EMBODIMENT

Figure 1:
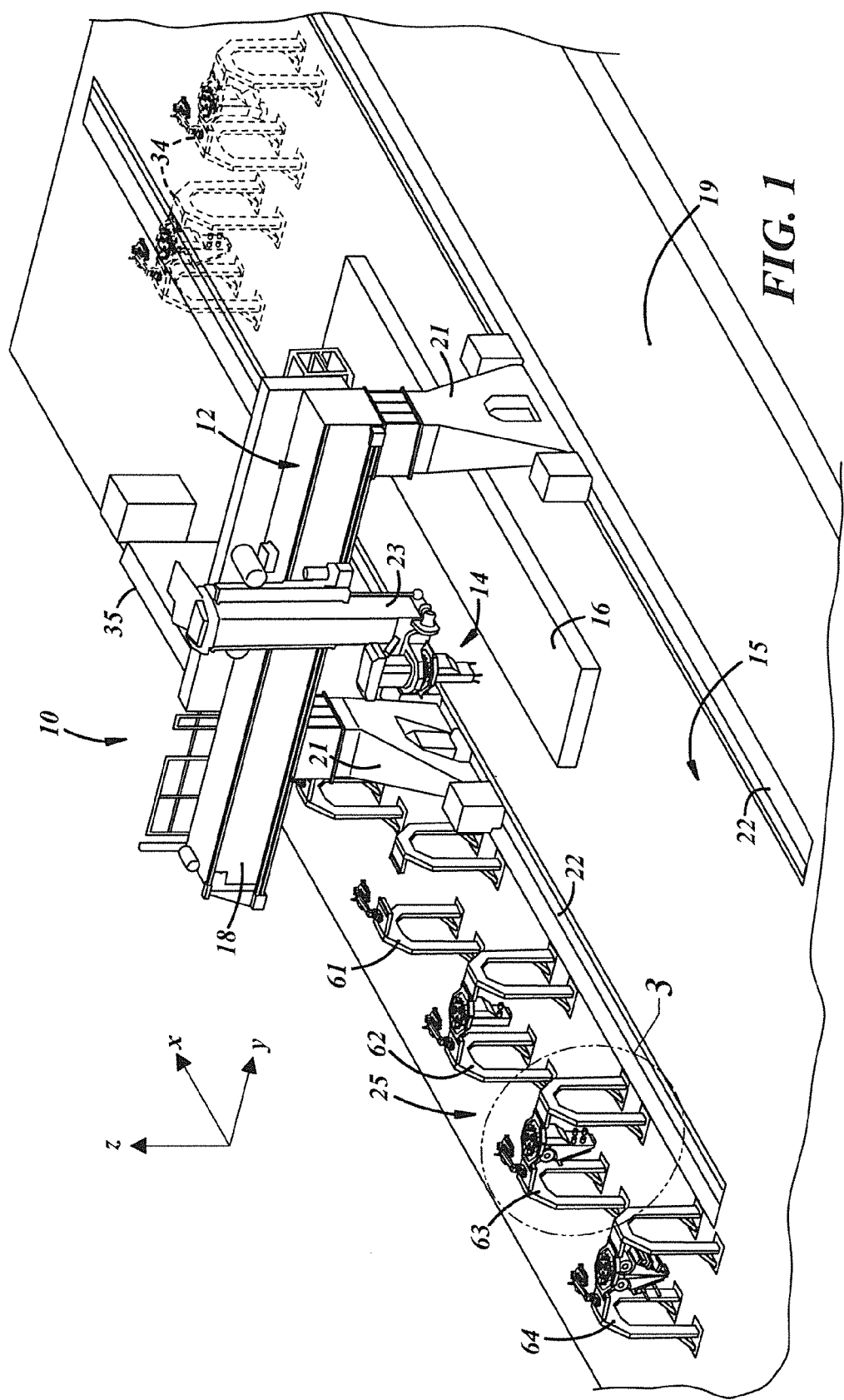
FIG. 1 is a perspective view of a gantry lamination system.

FIG. 1 shows a gantry type composite placement machine 10 comprising a six-axis positioner 12 and a head 14. The head 14 may comprise an integrated head and creel so that the head carries with it the composite material that will be laid on the tool 16 in the workzone 15. The integrated head 14 applies composite material to a tool 16. The head 14 is provided with six motion axes by the six-axis positioner 12.

The positioner 12 comprises a horizontal beam 18 that is supported above the factory floor 19 by a pair of spaced upright support members 21 that are mounted on rails 22 on the factory floor. The space between the rails 22 is called the workzone 15. The form or tool 16 is positioned in the workzone 15. A vertical Z-axis column 23 is supported on the horizontal beam 18. The positioner 12 is able to move horizontally in the X-axis along the rails 22, the column 23 is able to move horizontally in the Y-axis across the gantry beam 18, and the column 23 is able to move vertically in the Z-axis, thus giving the head 14 motion in the X, Y, and Z-axes. The horizontal beam 18 extends beyond at least one of the spaced upright support members 21 so that the vertical column 23 can be positioned over a docking zone 25, outside of the workzone 15. One or more docking stations 26 are located in the docking zone 25. Each docking station 26 has assigned to it a head 14. Each of the heads 14 may be capable of performing different functions relating to a composite placement process. Docking stations 34 may also be located at one or both ends of the workzone 15.

Figure 2:
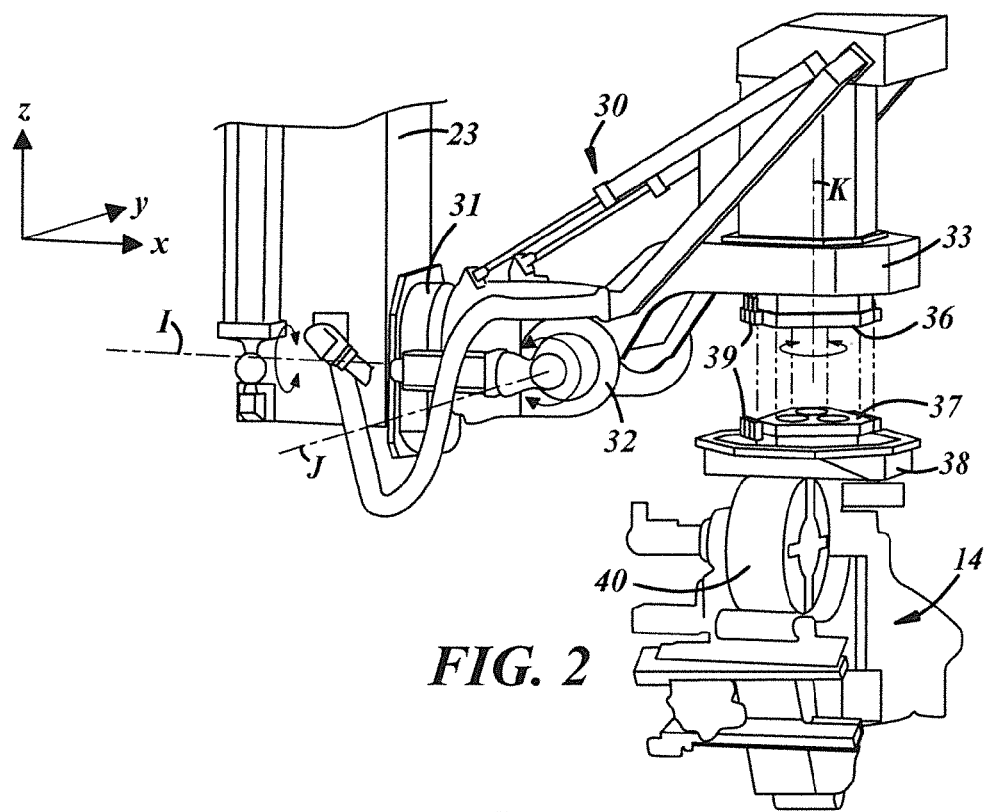
FIG. 2 is a detail view of the wrist mechanism that joins a composite placement head to the end of a gantry column.

FIG. 2 shows that the head 14 is mounted on a wrist 30 that is supported on the lower end of the Z-axis column 23. The wrist comprises an I-axis turntable 31 that is coupled to the lower end of the column 23, a J-axis yoke 32 that is coupled to the I-axis turntable 31, and a K-axis yoke 33 that is supported by the J-axis yoke 32. The I-axis turntable 31 allows the head 14 to pivot about an I-axis that is parallel to the X-axis of the machine, the J-axis yoke 32 allows the head 14 to pivot about a J-axis that is parallel to the Y-axis of the machine, and the K-axis yoke 33 allows the head 14 to pivot about a K-axis that is parallel to the Z-axis of the machine. The wrist 30 contains the necessary motors, gears, and drives to rotate the wrist about the I, J, and K axes. The linear motion of the gantry in the X, Y, and Z-axis, and the rotary motion of the wrist around the I, J, and K axis provide the positioner with six axes of motion. The motion of the gantry 12 and the head 14 may be controlled by an operator at a control panel 35, or by CNC located in the control panel 35.

The head 14 can take several forms; a head that applies wide composite tape reeled with backing paper to a tool 16, a head that applies composite fiber towpreg (⅛", ¼", ½") to a tool, an ink jet marking head for ply placement checking and referencing, a ply perimeter trimming head comprising an ultrasonic or other type of ply cutter, a head with suction cups or other ply engaging device for ply placement onto a tool, a ply filler head for small precut pieces placement that are reeled with backing film, and other types of heads which may be required in for composite material lay-up. The head 14 shown in FIG. 2 is a tape laying head that carries a supply of tape 40 on one or more reels on the head.

An upper coupling plate 36 is mounted after the sixth primary axis (the K-axis) of the six-axis positioner on the lower end of the K-axis yoke 33. A lower coupling plate 37 is mounted on the upper frame 38 of the head 14, and the upper and lower coupling plates 36,37 couple together by means of mechanical clamps (not shown) to mount the head 14 to the wrist 30. The upper and lower coupling plates 36,37 are a type of quick release clamping ring, and together form a docking point where a head 14 may be quickly detached from the positioner 12. The upper and lower coupling plates 36,37 have separable connectors 39 for utilities and signal connections so that electrical power, pneumatic power, and signals from the wrist 30 can be coupled to the head 14 when the head is mounted on the end of the wrist. The lower coupling plates 37 for all of the heads are the same, allowing all of the heads to be coupled to the end of the wrist 30 without changing coupling hardware.

Figure 3:
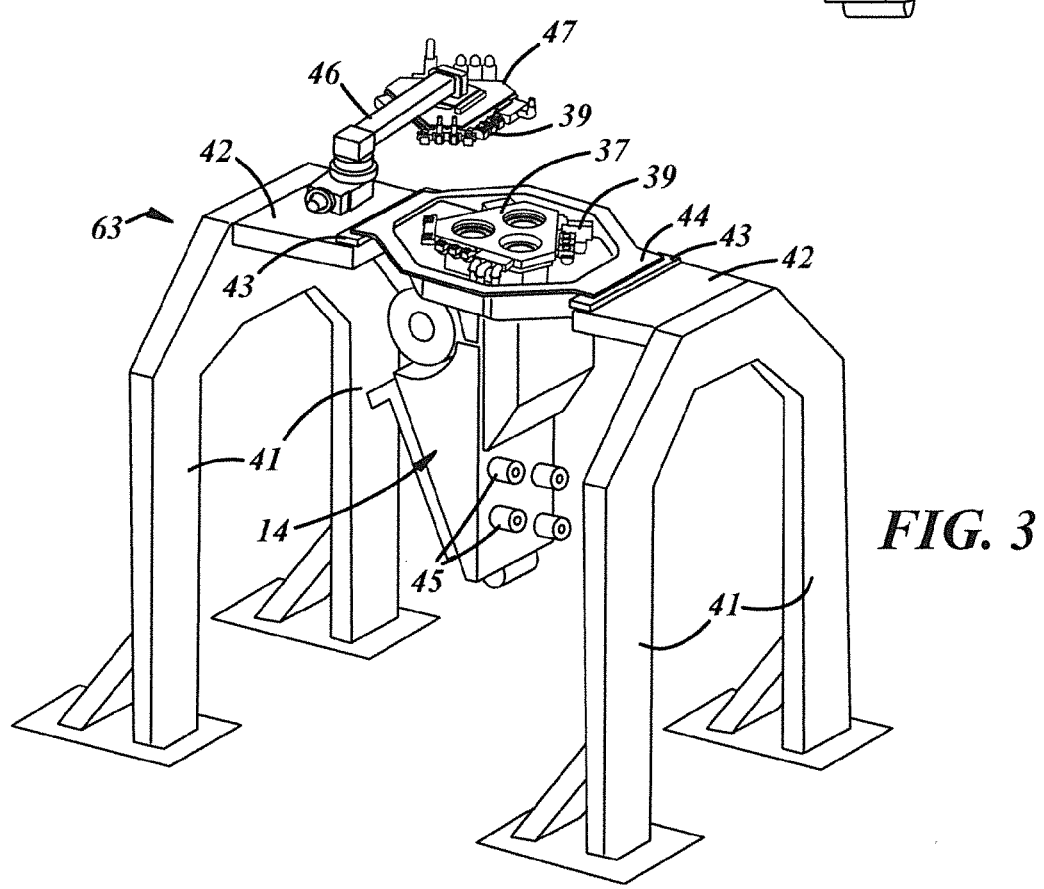
FIG. 3 is a detail view of a head docking station designated by the section line 3 in FIG. 1.

FIG. 3 shows a head 14 positioned in a docking station 63. The docking station is live meaning that is able to connect electrical power, pneumatic power, and signals to the head 14 as explained more fully below. The docking station comprises four legs 41 which form a base that rests on the floor 19, and the base supports two shoulder portions 42. A support bar 43 is mounted on each shoulder portion 42. Two sides of the lower coupling plate 37 that is mounted on the head 14 have support flanges 44 that extend outward from the lower coupling plate 37. The support flanges 44 on the lower coupling plate 37 rest on the support bars 43 so that the head can be suspended from the shoulders 42 of the docking station 63. A utilities arm 46 with a maintenance plate 47 is mounted on the top of the docking station 63. The utilities arm 46 contains electrical power, pneumatic power, and signal conductors that are connected to the maintenance plate 47. The head 14 shown in FIG. 3 is a fiber placement head that carries spools of fiber 45 on one or more spindles on the head.

Figure 4:
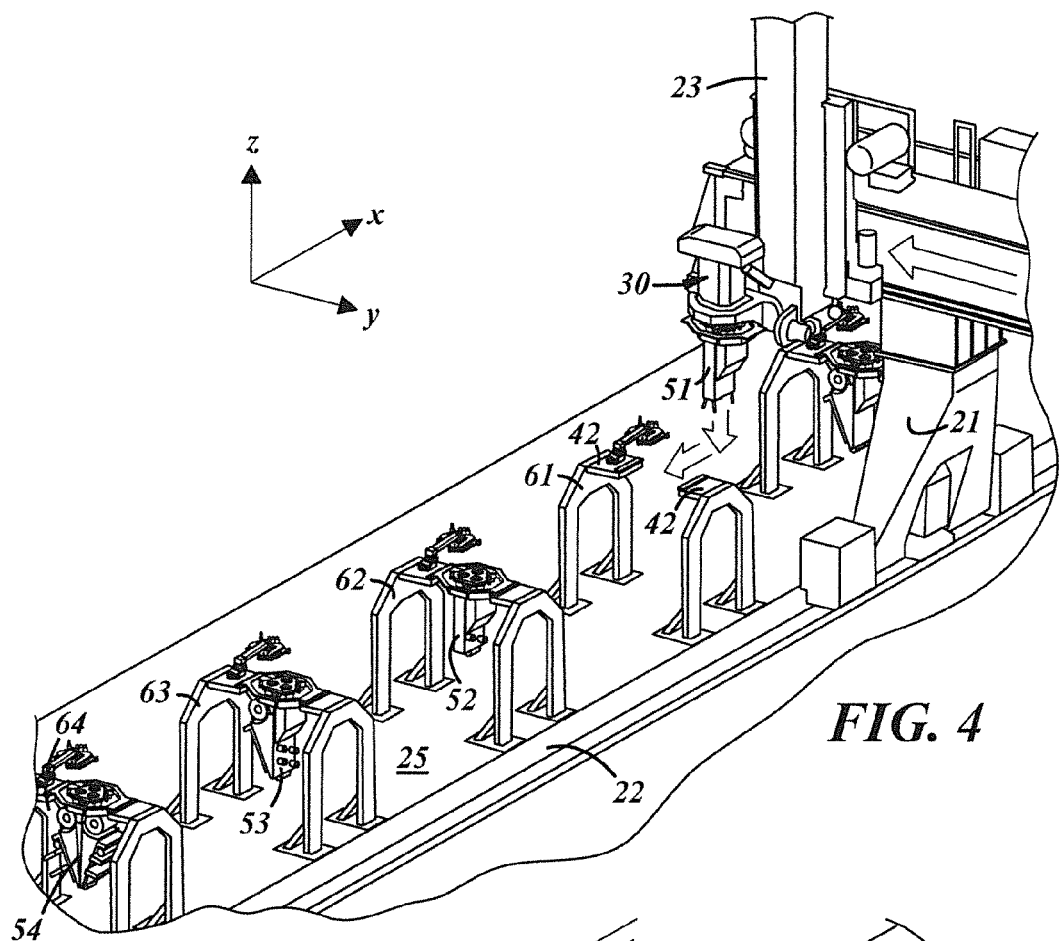
FIG. 4 is a detail view showing motion of the gantry column to dock a head at a first docking station.
Figure 5:
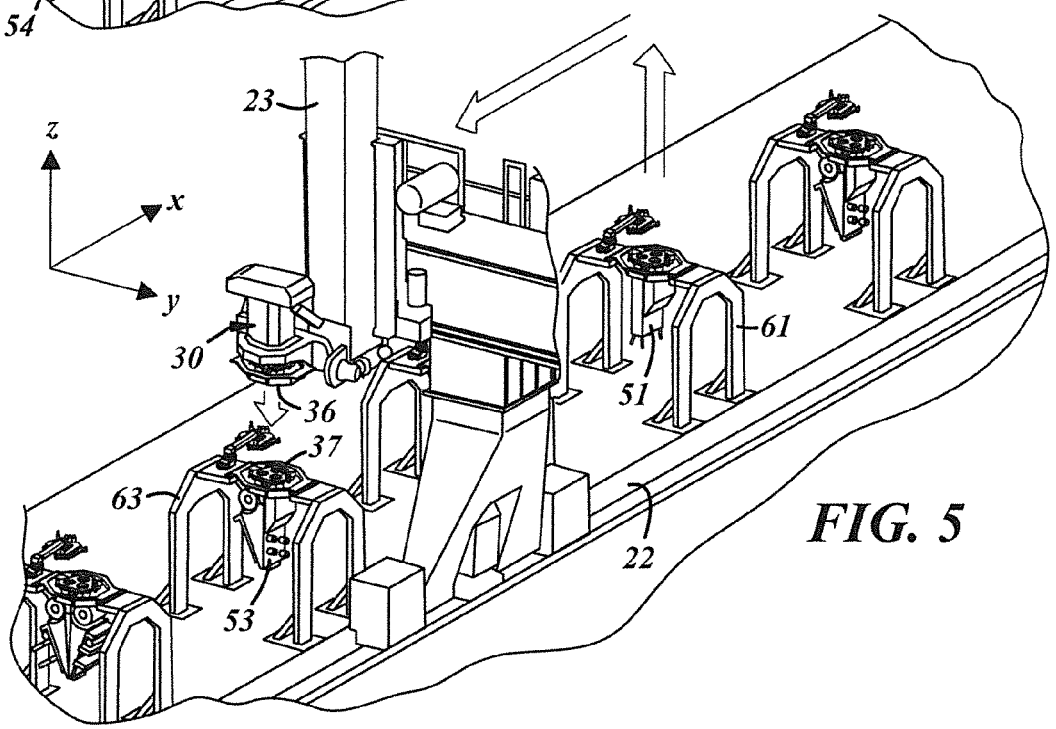
FIG. 5 is a detail view showing motion of the gantry mechanism along the Z and X-axis to a second docking station in the docking zone.
Figure 6:
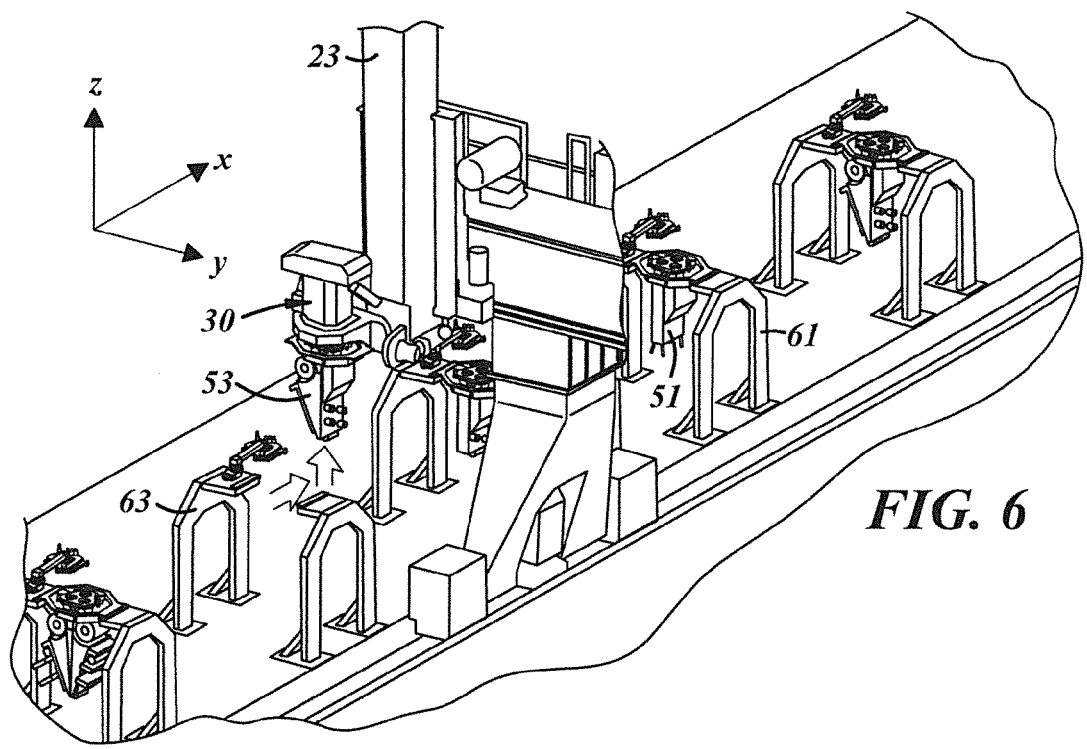
FIG. 6 is a detail view showing motion of the gantry column in the X and Z-axis to retrieve a head at a second docking station.

FIG. 4 shows motion of the gantry column 23 beyond one of the spaced upright support members 21 so that the gantry column 23 is positioned over the docking zone 25. In FIGS. 4-6, the docking stations have been assigned reference numbers 61-64, and the heads that are supported by the docking stations 61-64 have been assigned reference numbers 51-54, respectively. Arrows show the motion of the gantry to position a first head 51 so that it can be docked at the first docking station 61. Once the head 51 is vertically aligned with a space between the first docking station 61 and an adjacent docking station, the column lowers along the Z-axis until lower coupling plate 37 on the first head 51 is slightly above the height of the support bars at the first docking station, and the head then is moved horizontally into the space between the two shoulders 42 of the first docking station. The column 23 then lowers until the lower coupling plate 37 on the first head 51 is resting on the support bars 43 on the first docking station 61. The clamps on the upper and lower coupling plates 36 and 37 release so that the column 23 can be raised, leaving the first head 51 in the first docking station 61. In another embodiment of the invention, the head 51 is vertically aligned over the docking station 61 and the column 23 then lowers the head into docking station 61 without a second horizontal move. In this embodiment, the head must be dimensioned to fit between the shoulders 42 of the docking station so that it can be lowered directly into the docking station.

FIG. 5 shows motion of the gantry mechanism 12 along the X-axis to a third docking station 63 in the docking zone 25. The gantry travels along the X-axis until the upper coupling plate 36 is aligned with a third head 53 in the third docking station 63. The column 23 then lowers so that the upper coupling plate 36 on the lower end of the K-axis of the wrist 30 contacts the lower coupling plate 37 on the third head 53. The clamps on the upper and lower coupling plates are activated and the third head 53 becomes attached to the wrist 30. The lower coupling plate 37 for each head is the same so that each head can mate to the same upper coupling plate mounted on the lower end of the K-axis.

FIG. 6 is a detail view showing motion of the gantry column to remove the third head 53 from the third docking station 63. The column 23 raises slightly to lift the head off of the support bars 43 on the docking station, and the gantry 12 with the column moves in the X-axis to move the head horizontally until the head 53 can be raised without interference from the structure of the docking station 63. The gantry 12 then moves the head into the workzone 15 to continue with the composite manufacturing process.

Figure 7:
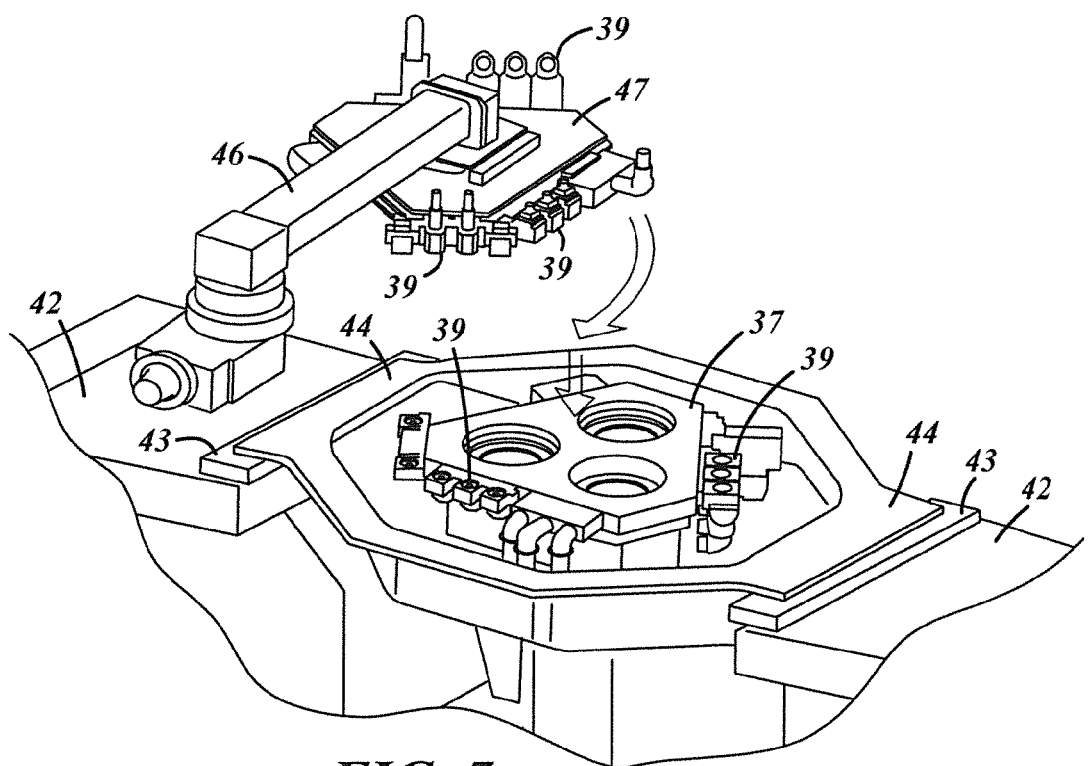
FIG. 7 is a detail view showing a utilities arm and an attached maintenance plate in a standby position in a docking station.

FIG. 7 is a detail view showing the utilities arm 46 and maintenance plate 47 in a standby position. From this position, the utilities arm 46 can be swung to a position so that the maintenance plate is in vertical alignment with the lower coupling plate 37 that is mounted on the head 14. The maintenance plate 47 and then lowered from the end of the utilities arm until it contacts the lower coupling plate 37 as shown in FIG. 8.

Figure 8:
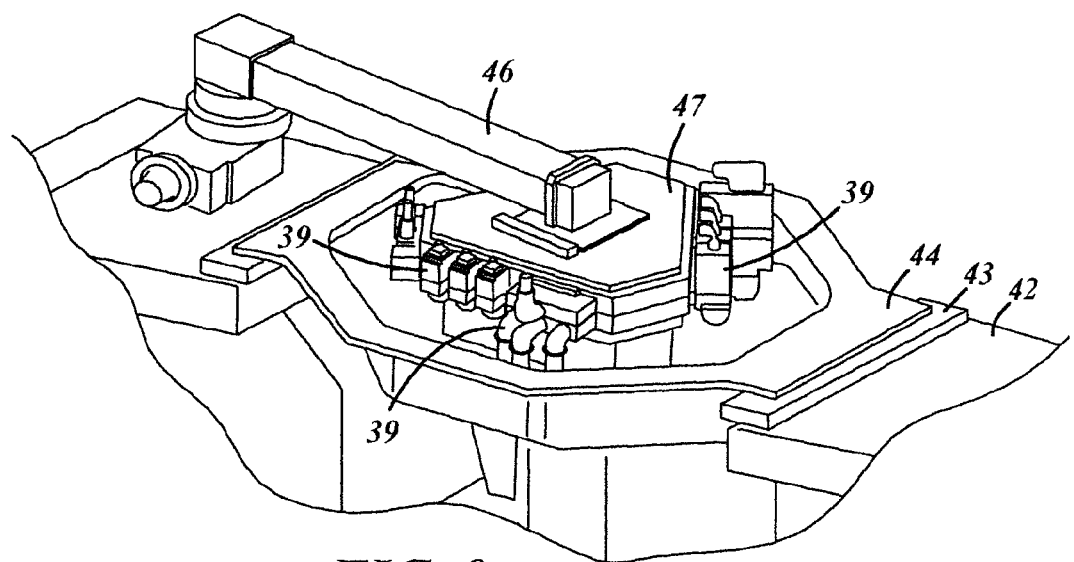
FIG. 8 is a detail view showing the motion of a live utilities arm and the attached maintenance plate coupling with the lower coupling plate on a composite head.

FIG. 8 shows the maintenance plate 47 mated to the lower coupling plate 37. In this position, the separable connectors 39 around the perimeter of the maintenance plate 47 and the lower coupling plate 37 mate with one another. The maintenance plate 47 couples utilities and signals from the control panel 35 to the lower coupling plate 37 so that the head 14 can be powered up and run for testing or maintenance purposes. When it is desired to remove a head 14 from a docking station 26 to mount the head on the six-axis positioner 12, or for any other purpose, the maintenance plate 47 is raised out of contact with the lower coupling plate 37 and swung to the side of the lower coupling plate as shown in FIG. 7.

In operation, the head 14 is able to separate from the wrist 30 and be docked for maintenance and repair purposes at a docking station 26 that is located within the reach and travel of the gantry manipulator. Once a first head is removed from the machine and docked, it can be replaced with a second head so that the gantry machine can quickly switch between tape laying and fiber placement lamination process, or other material lamination processes that are supported by the several forms of the head. The docking point formed by the upper and lower coupling plates 36, 37 where the heads 14 quickly detach from the machine is after the sixth primary axis of the gantry manipulator 12. The heads have none of the six primary machine axes built into them, thus reducing detached head cost and complexity. All the drive components necessary for the six gantry axes remain with the gantry when any of the heads are removed and stored in a docking station. The live docking stations support the detached heads while the six-axis gantry is laying the composite material or performing some other function relating to the lay-up process with the attached head, increasing the efficiency and throughput of the system. The live docking stations allow access to the heads for material replenishment and maintenance.

The composites system described above saves considerable cost in equipment, infrastructure and labor cost traditionally needed for two separate tape and fiber systems, making it ideal for suppliers and manufacturers who require cost economy and flexible capabilities. The system makes it possible for fabricators to consider combining composite CTL grade tape and fiber towpreg in the same part.

Having thus described the device, various modifications and alterations will be apparent to those skilled in the art, which modifications and alterations are within the scope of the device as defined by the appended claims.

The invention claimed is:

1. A composites lamination system comprising a six-axis positioner and multiple removable heads for applying composite material to a tool, the system comprising:
   a gantry and a wrist comprising the six-axis positioner;
   the gantry having two spaced uprights that support a crossbeam, wherein the uprights and the crossbeam are movable in the X-axis;
   a workzone for a tool positioned between the two spaced uprights;
   a movable column supported on the crossbeam, wherein the column is movable relative to the crossbeam in the Y-axis and the Z-axis;
   a wrist mounted on the column, wherein the wrist rotates around an I-axis parallel to the X-axis, around a J-axis parallel to the Y-axis, and around a K-axis parallel to the Z-axis;
   a replaceable head mounted on the wrist on the end of the K-axis, whereby the gantry and the wrist provide six axis of motion for the replaceable head, and removal of the head from the wrist allows the six axis of motion to remain with the positioner;
   a plurality of docking stations in a docking zone;
   at least one of the docking stations comprising a live docking station, whereby the live docking station is able to couple at least one of electrical power, pneumatic power, and signals to a head positioned in the live docking station;
   an upper and lower coupling plate coupling the replaceable head to the wrist, the upper coupling plate being mounted on the end of the sixth axis of the positioner, and the lower coupling plate being mounted on an upper frame portion of the head;
   separable connectors for utilities and signal connections on the upper and lower coupling plates, the separable connectors coupling electrical power, pneumatic power, and signals from the wrist to the head when the head is mounted on the end of the wrist;
   a maintenance plate mounted to the live docking station; and
   separable connectors around the perimeter of the maintenance plate, whereby the separable connectors on the maintenance plate mate with the separable connectors on the lower coupling plate of the head in the live docking station, and whereby the maintenance plate couples utilities and signals to the lower coupling plate so that the head can be powered up and run in the live docking station for testing or maintenance purposes.

2. The composites lamination system of claim 1 further comprising:
   said docking zone positioned outside of the work zone, and outside of the two spaced uprights; and,
   one end of the crossbeam extending beyond one of the spaced uprights and over the docking zone, whereby the column may travel across the crossbeam from a position over the workzone to a position over the docking zone, and whereby the column may deposit a head in an empty docking station in the docking zone or pick up a head in the docking zone.

3. The composites lamination system of claim 2 further comprising:
   a plurality of live docking stations in the docking zone;
   at least two different types of heads supported in the live docking stations, wherein the lower coupling plates on all of the heads are the same, allowing all of the heads to be coupled to the same upper coupling plate on the end of the wrist without changing coupling hardware.

4. The composites lamination system of claim 1 further comprising:
   the docking zone positioned outside of the work zone;
   a plurality of heads positioned one each in the docking stations;
   a first head in a first docking station and a second head in a second docking station;
   wherein the first head may be a fiber towpreg placement head and the second head may be a wide composite tape laying head, whereby the composites lamination system may deposit fiber towpreg on the tool using the first head and wide composite tape on the tool using the second head.

5. The composites lamination system of claim 1 wherein the wrist is mounted on the lower end of the column.

6. The composites lamination system of claim 5 further comprising:
   an I-axis turntable that is coupled to the lower end of the column;
   a J-axis yoke that is coupled to the I-axis turntable; and,
   a K-axis yoke that is supported by the J-axis yoke, whereby the head is mounted on the end of the K-axis yoke.

7. The composites lamination system of claim 1 further comprising:
   a first replaceable head that applies wide composite tape to a tool;
   a second replaceable head that applies fiber towpreg to a tool; and,
   any other type of head that may be required for composite material lay-up.

8. The composites lamination system of claim 1 further comprising:
   a docking zone positioned at one end of the workzone;
   the docking zone containing at least one docking station for receiving a composite placement head.

9. A composites lamination system comprising a six-axis positioner and multiple removable heads for applying composite material to a tool, the system comprising:

a gantry and a wrist comprising the six-axis positioner;

a replaceable head mounted on the wrist, whereby the gantry and the wrist provide six axis of motion for the replaceable head, and removal of the head from the wrist allows the six axis of motion to remain with the positioner;

a plurality of docking stations for the replaceable head, at least one of the docking stations comprising a live docking station, whereby the live docking station is able to couple at least one of electrical power, pneumatic power, and signals to a head positioned in the live docking station;

a lower coupling plate on the replaceable head, the lower coupling plate having separable connectors coupling electrical power, pneumatic power, and signals from the wrist to the head when the head is mounted on the end of the wrist;

a maintenance plate mounted to the live docking station; and separable connectors around the perimeter of the maintenance plate, whereby the separable connectors on the maintenance plate mate with the separable connectors on the lower coupling plate of the head in the live docking station, whereby the maintenance plate couples utilities and signals to the lower coupling plate so that the head can be powered up and run in the live docking station for testing or maintenance purposes.

10. The composites lamination system of claim 9 further comprising:

at least two replaceable heads that may be mounted on the wrist, wherein a first of the at least two replaceable heads applies wide composite tape to a tool, and wherein a second of the at least two replaceable heads applies fiber towpreg to a tool.

\* \* \* \* \*